June 20, 1939.  V. W. ERICKSON  2,162,843
SPRING SUSPENSION
Filed Dec. 10, 1938   2 Sheets-Sheet 1

Inventor
V. W. Erickson
By Clarence A. O'Brien
Hyman Berman
Attorneys

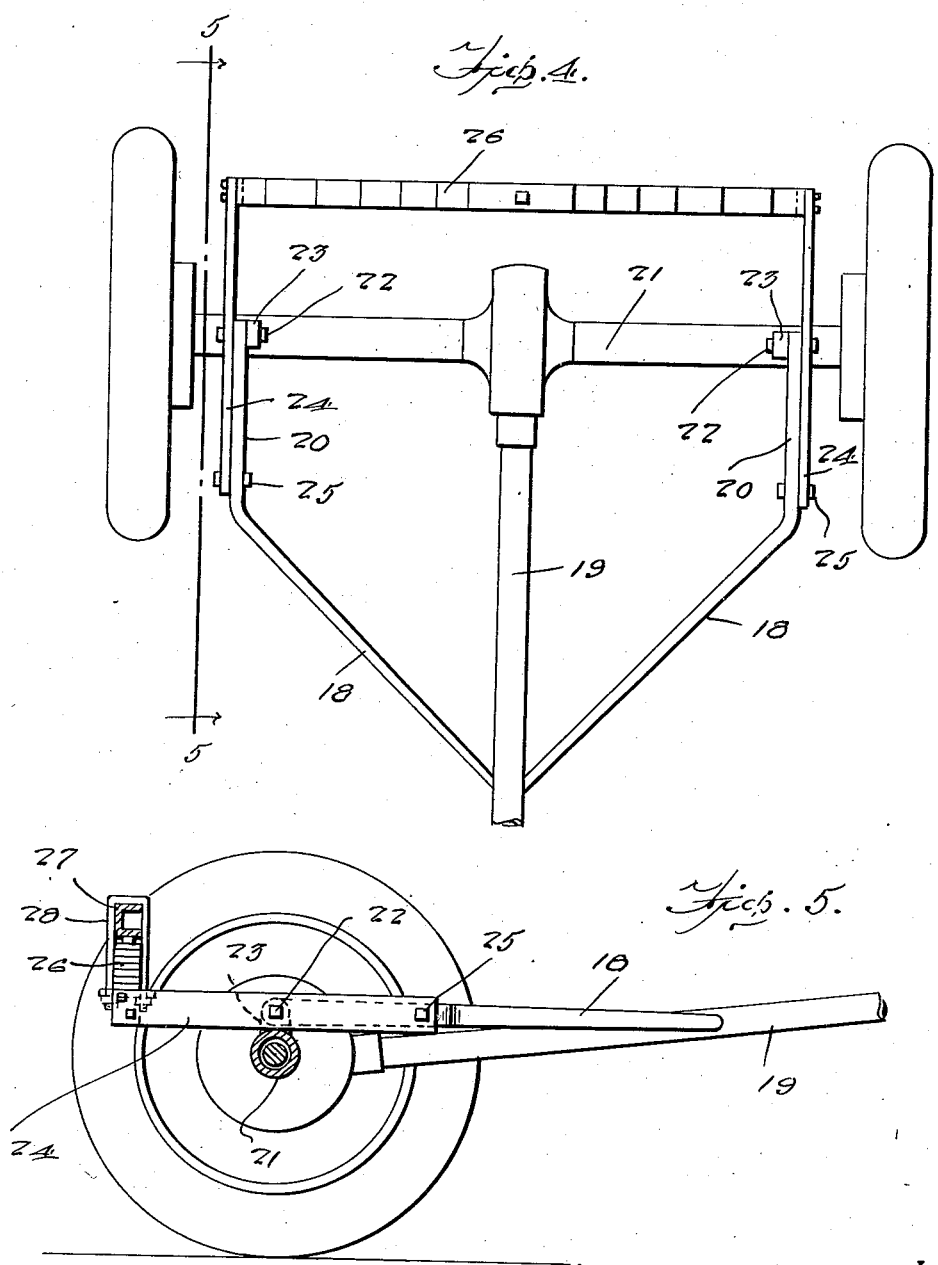

Patented June 20, 1939

2,162,843

UNITED STATES PATENT OFFICE 2,162,843

SPRING SUSPENSION

Vernon W. Erickson, Grand Coulee, Wash.

Application December 10, 1938, Serial No. 245,005

2 Claims. (Cl. 280—106.5)

My invention relates to improvements in automobile springs and mountings therefor and the primary object of the invention is to eliminate the usual spring shackles of present day spring mountings together with wear incident to their functioning and service necessary to their upkeep and to provide a more practical, flexible and substantially frictionless mounting for the springs, particularly transverse springs such as are now commonly used.

Other objects are to provide, as compared with present day springs and mountings, a more simplified arrangement and construction which is more economical to manufacture, install and service and well adapted for both light and heavy load suspension.

To the accomplishment of the above and subordinate objects, presently appearing, a preferred embodiment of my invention has been illustrated in the accompanying drawings, set forth in detail in the following description, and defined in the claims appended hereto.

In said drawings:—

Figure 1:
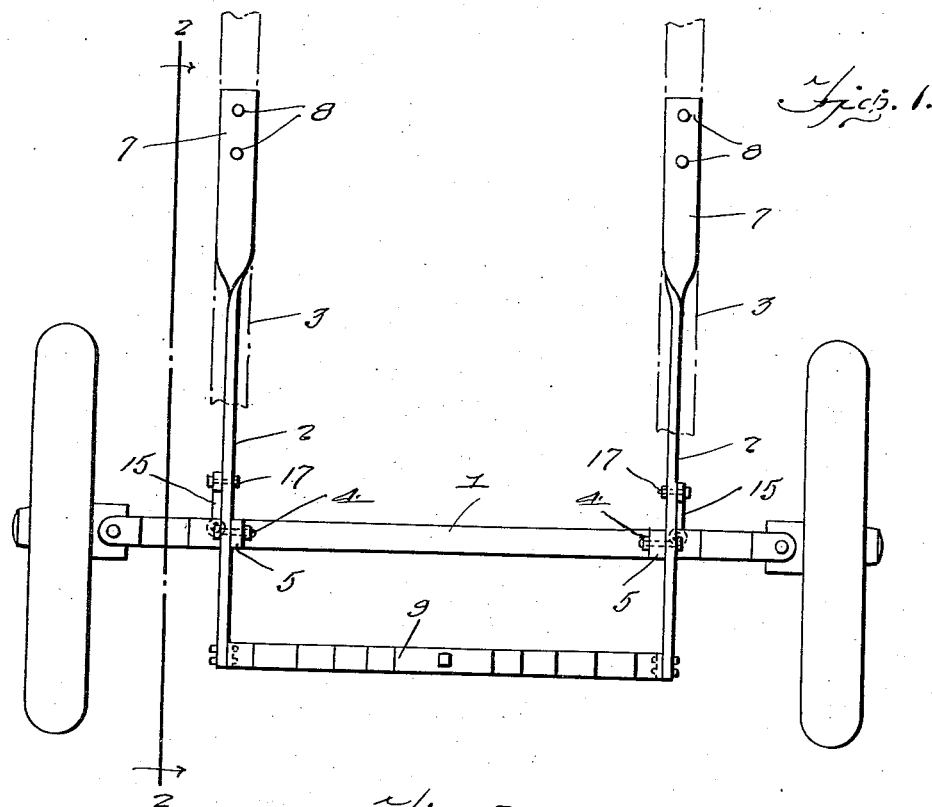
Figure 2:
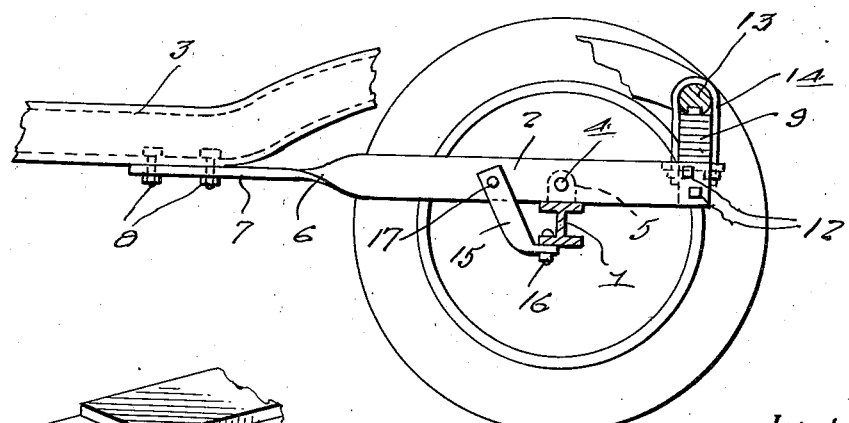
Figure 3:
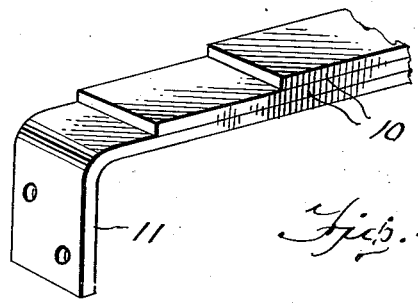

Figure 1 is a fragmentary view in top plan of a front spring and mounting constructed in accordance with my invention, Figure 2 is a view in section taken on the line 2—2 of Figure 1 looking in the direction indicated by the arrows, Figure 3 is a fragmentary view in perspective of the front spring, Figure 4 is a view similar to Figure 1 of the rear spring and mounting of my invention, and Figure 5 is a view in section taken on the line 5—5 of Figure 4 looking in the direction indicated by the arrows.

Referring to the drawings by numerals, in the illustrated embodiment of my invention, the front axle 1 of the automobile is equipped with a pair of flat, resilient load supporting side bars 2 extending parallel with the side bars 3 of the chassis beneath the same and connected to the axle 1 intermediate their ends to extend forwardly for a short distance therefrom and rearwardly for a greater distance. The degree of extension of the bars 2 may be varied as occasion may require in connection with different types of automobiles, for instance, pleasure cars and trucks. The bars 2 are stood on edge on the axle 1 and fixedly secured thereto, as at 4, to upstanding lugs 5 provided on said axle. The rear ends of the bars 2 are twisted, as at 6, to form horizontal rear portions 7, bolted as at 8, to the underside of the side bars 3, the latter arching forwardly, as usual, but in this instance over the bars 2. A transverse spring 9 extends between the front ends of the bars 2 comprising leaves 10, the lowermost one of which is provided at its ends with downturned ears 11 bolted flat to the front ends of the bars 2 as shown at 12. The front end 13 of the chassis is secured upon the spring 9, as by clips 14, but the spring 9 is so designed that under the normal load the leaves 10 thereof are flexed into substantially straight position is indicated for instance in Figure 3.

As will now be manifest, the front ends of the bars 2 are free to flex laterally and to permit end play of the spring 9 under flexing thereof. Thus said bars 2 function at said ends as both auxiliary springs and shock absorbers on the rebound or upward flexing of the spring 9. The rear ends of the bars 2 also function as auxiliary springs for additionally suspending the load and as will be clear by flexing vertically in conjunction with the spring 9 serves to additionally check upward rebound in a manner which will be understood. A pair of torque neutralizing bars 15 connect the side bars 2 to the axle 1. The torque neutralizing bars 15 are short, flat members of suitable metal bolted at one end, as at 16, to the underside of the axle 1 and extending upwardly and rearwardly to the bars 2 to which they are each connected by a bolt 17. The torque neutralizing bars 15 function to offset or oppose braking torque on the axle 1.

Referring now to the rear spring and mounting, in the present instance the mounting includes a pair of radius rods 18 connected at their front ends in any suitable manner to the drive shaft housing 19 and bent at their rear ends to provide rear straight portions 20 parallel with each other and at right angles to the rear axle housing 21 to which said portions are fixed, as by bolts 22 passing through ears 23 upstanding from said housing. A pair of flat load supporting side bars 24 are secured intermediate their ends to the straight portions 20 flat against the same by the bolts 22 and at their front ends to said portions by bolts 25 with the rear ends thereof extending beyond the axle housing 21. The bars 24 are, as in the case of bars 2, disposed edgewise on the housing 21 and a rear transverse spring 26 similar to spring 9 is secured to the rear ends of said bars 24 in the same manner as described with reference to the spring 9. The rear bar 27 of the chassis is suitably secured to the spring 26 by clips 28. The action of the bars 24 is the same, as regards the rear ends thereof, as that of the bars 2. The front ends of said bars 24 are held by the bolts 22 and 25 substantially rigid laterally.

The operation of the rear spring 26 will, it is believed, be understood from the foregoing without further explanation.

It is to be understood that the invention as described is illustrative rather than restrictive and that the principle of spring suspension herein disclosed may be modified and utilized in connection with other types of springs, without departing from the inventive concept. Hence, right is herein resrved to all such modifications falling within the scope of the claims appended hereto.

What I claim is:—

1. The combination with an axle of an automobile, and a chassis frame, of a pair of flat resilient load supporting side bars secured edgewise upon said axle in parallel relation to extend therefrom, and a transverse spring fixed at its opposite ends to extended ends of said bars and supporting said chassis frame, said bars flexing laterally between the axle and said spring, the other ends of said bars being connected to a relatively fixed part of the automobile.

2. The combination with the axle of an automobile, and a chassis frame, of a pair of flat resilient load supporting side bars secured intermediate their ends upon said axle in parallel relation to extend therefrom upon both sides thereof, a transverse spring fixed at its opposite ends to corresponding ends of said bars upon one side of the axle, said bars standing on edge on the axle and being twisted intermediate their ends to provide horizontally flat end portions, the chassis frame being connected to said horizontally flat end portions and to said spring centrally of the latter.

VERNON W. ERICKSON.